United States Patent [19]

Gartner et al.

[11] Patent Number: 4,718,930

[45] Date of Patent: Jan. 12, 1988

[54] METHOD OF AND APPARATUS FOR PRODUCING FIBERS FROM THERMOPLASTIC MATERIALS, IN PARTICULAR FROM GLASS FIBERS

[75] Inventors: Hans Gartner, Dannstadt-Schauernheim; Dietrich Schulz, Ludwigshafen, both of Fed. Rep. of Germany

[73] Assignee: Isover Saint-Gobain, Courbevoie, France

[21] Appl. No.: 917,537

[22] Filed: Oct. 10, 1986

[30] Foreign Application Priority Data

Oct. 10, 1985 [DE] Fed. Rep. of Germany ....... 3536137

[51] Int. Cl.⁴ .................. C03B 37/04; C03B 37/07
[52] U.S. Cl. ................................. 65/6; 65/14; 65/29; 65/162; 431/12
[58] Field of Search ............... 65/2, 6, 14, 29, 162; 431/12

[56] References Cited

U.S. PATENT DOCUMENTS

| | | | |
|---|---|---|---|
| 3,988,139 | 10/1976 | Goodwin | 65/162 |
| 4,312,658 | 1/1982 | Mayer | 65/162 X |
| 4,392,879 | 7/1983 | Takeuchi et al. | 65/6 |
| 4,401,452 | 8/1983 | Eisenberg | 65/2 |

*Primary Examiner*—Robert L. Lindsay
*Attorney, Agent, or Firm*—Oblon, Fisher, Spivak, McClelland, & Maier

[57] ABSTRACT

By means of at least one radiation pyrometer, the radiation emission emerging at the surface of the peripheral wall of a centrifugal ring is continuously detected and used for process control as an actual value in a control circuit for hot gas flow. In consequence, optimum management of the centrifugal ring temperature is achieved and automation of the fibering process made possible, while at the same time harmful over-heating and shock-like temperature changes of the centrifugal ring are avoided.

3 Claims, 1 Drawing Figure

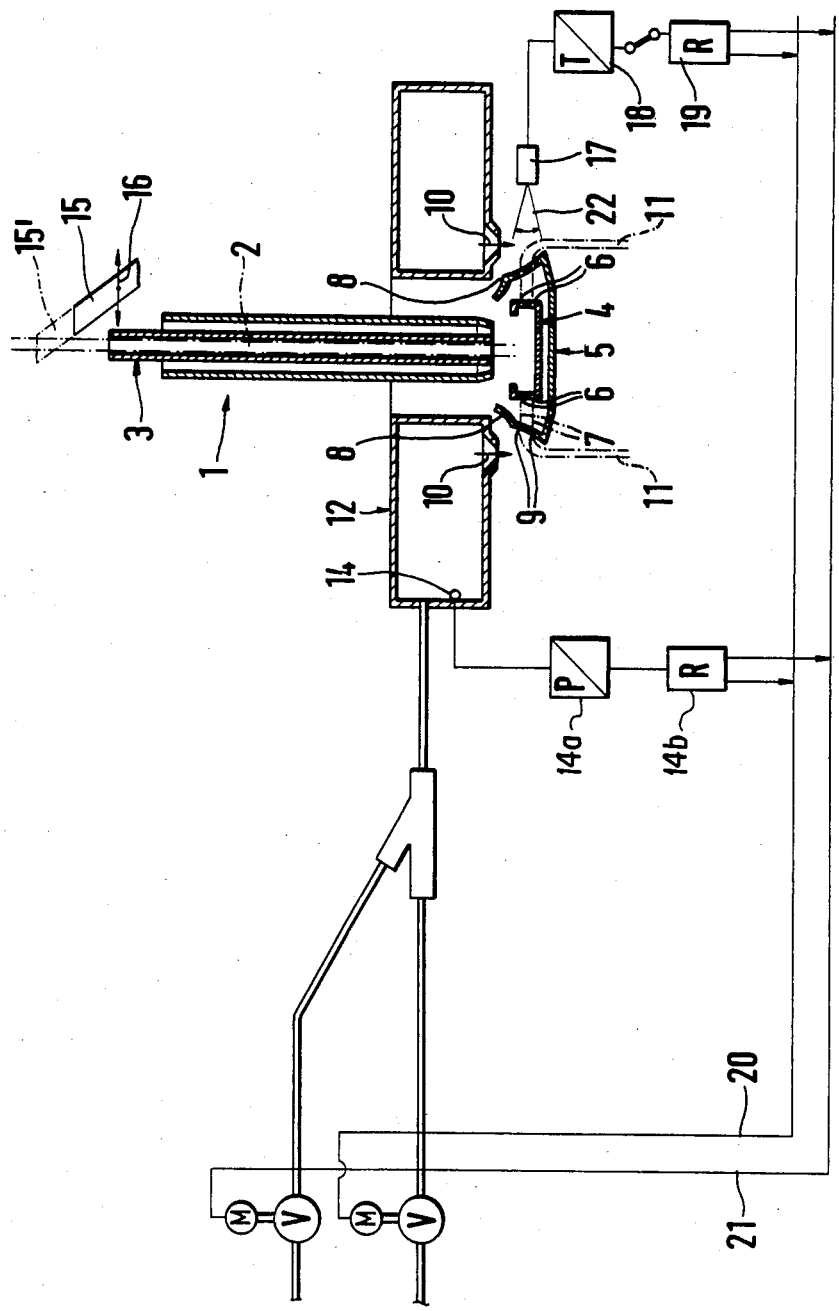

METHOD OF AND APPARATUS FOR PRODUCING FIBERS FROM THERMOPLASTIC MATERIALS, IN PARTICULAR FROM GLASS FIBERS

BACKGROUND OF THE INVENTION

1. Field of the Invention

The invention relates to a method and an apparatus for producing fibers from thermoplastic materials, in particular from glass fibers.

2. Background of the Related Art

When carrving out this such method (as disclosed in DOS No. 28 49 357), not only is there a need for consistent quality in the glass fiber products produced but also the manufacturing costs are of considerable importance. Since such a method is carried out at relatively high temperatures, the fibring apparatus used is exposed to particularly high stresses which affect the effective life of its centrifugal ring. The life of the centrifugal ring is also influenced by the fact that during operation the peripheral wall of the centrifugal ring may bulge out and thus pass into the hot gas flow, which means that this bulged-out wall part is exposed to particularly high temperature stresses.

Furthermore, in the case of an interruption in production during which the supply of molten material to the centrifugal ring is interrupted by an interposition of what is referred to as a frit channel, and the cooling effect of the molten material is no longer applicable, the centrifugal ring is entirely exposed in a flow of gas which is heated to more than 1400° C., which then can lead to a harmful over-heating of the centrifugal ring unless the temperature of the gas flow is rapidly reduced. It is possible, if there is an interruotion in production, to limit any increase in temperature at the peripheral wall of the centrifugal ring by manually measuring the temperature of the peripheral wall by means of a pyrometer and in consequence manually reducing the temperature of the gas flow. However, this represents an unsatisfactory management of temperature and does not reliably exclude the possibility of the centrifugal ring becoming overheated or being exposed to a shock cooling.

It is also known to determine the temperature of the gas flow by use of a thermo-element provided in the combustion chamber of the air-gas mixture, however, this technique only indicates a reference temperature, which is not necessarily proportional to the temperature of the cen.trifugal ring, so that it is not well suited for managing the temperature of the centrifugal ring.

SUMMARY OF THE INVENTION

It is the object of the invention to provide a method and apparatus for the fully-automatic temperature management of the centrifugal ring of a fibering apparatus, with particular attention to the prevention of the centrifugal ring becoming over-heated in any working situation, it being furthermore guaranteed that there is an even rise or fall in the temperature of the centrifuqal ring, for example when it is started up or shut down.

According to the method of the invention, fibers are produced from thermoplastic materials by the steps of first radially outwardly discharging molten thermoplastic material via outlet orifices in a peripheral wall of a drum-like centrifugal ring, second forming a high velocity flow of high temperature gas and impinging the flow of gas on the peripheral wall and the discharged molten material, to draw the molten material into a bell-like veil, third using radiation sensing means for measuring a maximum temperature of the peripheral wall, and finally using the measured maximum temperature to control the gas flow so that the peripheral wall is not overheated.

The invention also includes an apparatus for producing the fibers from thermoplastic material and includes the drum-like centrifugal ring having a peripheral wall including outlet orifices, means for supplying molten thermoplastic material to the ring, means for forminq a hiqh velocity flow of hiqh temperature gas and impinging the flow of gas on the peripheral wall and at least one stationary radiation pyrometer having a maximum radiation sensitivity in the range of 0.6 to 1.1$\mu$m, for measuring the maximum temperature of the peripheral wall, including means for vertically scanning limited vertical portions of the peripheral wall. Finally, the invention includes means for controlling the gas flow based on the measured maximum temperature, so that the peripheral wall is not overheated.

By reason of the fact that the radiation emission from the area of the centrifugal ring is detected for continuous temperature measurement and for use as an actual value in the control circuit, the temperature which is automatically ascertained as the actual temperature is the temperature of the centrifugal ring, which is the truly important temperature in process control. Furthermore, the continuous monitoring of the temperature of the peripheral wall of the centrifugal ring during operation of the fibering apparatus while there is no supply of molten material, in other words during stand-by conditions, provides for absolute protection against over-heating since in the event of a specific limit temperature value being exceeded, then directly at the point where the hot gas flow is generated, the quantity of air is increased and the quantity of gas reduced, so that this temperature can be lowered in direct relationship to the surface temperature of the centrifugal ring. Thus, a deformation of the centrifugal ring in this condition can be automatically and largely avoided. Furthermore, start-up and stoppage of the fibering apparatus can be program controlled so that the adjustment and control interventions required can be undertaken according to the measured temperature of the centrifugal ring. Indeed, it has already been possible to use portable pyrometers for manual measurement of the surface temperature of the peripheral wall of the centrifugal ring at certain intervals in order to detect any threatening over-heating of the centrifugal ring so that, if necessary, the desired value of the reference temperature of the gas flow may be readjusted by hand, but it has never been considered to continuously detect the radiation emission of the centrifugal ring and to use it as an actual value for controlling the temperature of the hot gas flow.

If the radiation emission of only a relatively small measurement spot is detected, then it is possible to selectively scan different levels over the height of the peripheral wall of the centrifugal ring, for example those levels of the centrifugal ring which experience shows to be most critical from the point of view of over-heating. The radiation emission from the hottest point and the temperature ascertained therefrom are thus not falsified to a certain extent by simultaneously detected radiation emissions from cooler locations, and an average temperature over a relatively large area of the surface is not ascertained. If the measurement spot is continuously traversed over the height of the peripheral wall then all areas of the peripheral wall are detected sequentially one afer another, which makes it possible to ascertain and evaluate the maximum value which arises in the process. Furthermore, it is very advantageous that the ascertained temperature of the centrifugal ring is used as an output variable for adjusting the quantity of air and also the quantity of gas according to a predetermined program.

A suitable apparatus is provided for automatically regulating the surface temperature of the centrifugal ring, and which has in addition to the centrifugal ring at least one rigidly disposed radiation pyrometer which constantly scans the area of the peripheral wall of the centrifugal ring and preferably measures the radiation emission substantially in the transitional zone between visible light and the infra-red range and in the near infra-red range. The temperatures in question here give rise in this spectral range to an irradiation between about 0.6 and 1.1μm and of relatively high intensity or output, so that a low-disturbance signal is obtained. For this spectral range, detectors are available of a moderately priced type, perhaps in the form of silicon photo elements.

A radiation pyrometer with a maximum value type memory and a pivoting lens system is preferably used, such as is known for measuring temoeratures of oscillating wires, welding seams, badly-guided parts, oxidized forgings and ingots, etc., in which the object to be measured is moving constantly out of the measuring zone. The maximum value memory stores for each pivoting cycle only the maximum value and displays this which, particularly in the case of moving objects, is used to detect the presence of the object being measured but in the present instance, however, is used in order to detect the hottest part of the object being measured and to base the transmitted measurement signal thereon.

The present invention achieves optimum management of the centrifugal ring temperature and permits of automation of the fibering process while at the same time avoiding harmful over-heating and shock-like temperature changes in the centrifugal ring, thus favorably influencing its effective life.

BRIEF DESCRIPTION OF THE DRAWING

Further details, features and advantages of the invention will become evident from the ensuing description of an embodiment which is schematically shown in the accompanying sole FIGURE.

The drawing shows the disclosed spinner in detail.

DETAILED DESCRIPTION OF THE PREFERRED EMBODIMENT

The drawing shows diagrammatically at 1 a fibering apparatus in which a stream 2 of molten material falls through a hollow shaft 3 into a basket 4 of a centrifugal ring 5. Around its periphery, the basket 4 has relatively large discharge orifices 6 for the molten material. This latter is applied in relatively thick radial streams 7 to the inside face of a peripheral wall 8 of the centrifugal ring 5 where it passes through fine outlet orifices 9, from which it is thrown out by centrifugal force, initially in a radial direction. Immediately upon emerging from the outlet orifices 9, the fine streams of molten material are picked up by a downwardly directed annular gas flow 10 moving at high temperature and high velocity, as indicated by the arrows. The gas flow 10 encircles the peripheral wall 8 and produces a veil 11 of molten material in area where the fine threads of molten material emerging from the outlet orifices 9 are begun to be drawn out into fibers of a desired fineness which cool and solidify as the process continues.

For generating the gas flow 10, an annular combustion chamber 12 is provided in which the gas flow 10 is generated at a specific temperature and pressure by combustion of a gas-air mixture. During the actual fibering process, the pressure of the combustion gas is measured by a pressure sensor 14. A pressure transducer 14a fed by the pressure sensor controls the gas pressure in the combustion chamber 12 at a predetermined value, via a pressure regulator 14b. Upon an increase in the supply of gaseous fuel and a corresponding reduction of the supply of air, the gas flow 10 acquires a higher temperature, while conversely in the event of an increase in the supply of air with a corresponding reduction in the supply of fuel, the temperature of the gas flow 10 is reduced. Thus the combustion gas temperature is a function of the air/fuel ratio in the combustion chamber.

In order to interrupt the stream 2 of molten material emerging continuously from a feeder, not shown, what is referred to as a frit channel 15 is provided, which according to the double-headed arrow 16, can be extended into the falling stream 2 of molten material (shown by dash-dotted lines at 15'), catching the stream and diverting it before it enters the hollow shaft 3. Such a procedure is used, for example, if work is to be interrupted. In this case, the centrifugal ring 5 suddenly ceases to receive any molten material but remains exposed to hot gas flow 10, so that there is a particular risk of the centrifugal ring 5 becoming over-heated.

In order to detect the centrifugal ring temperature, which is required for control purposes, a radiation pyrometer 17 is provided for scanninq the gas flow 10 of the combustion chamber 12 and acting, via a transducer 18 with a maximum value type memory, on a preprogrammed controller 19 which is connected to a gas fuel line 20 and an air line 21. The sensitivity of the radiation pyrometer 17 lies in the near infra-red range between about 0.6 and 1.1μm), the spectral range which affects measurement being possibly between 0.6μm), in other words at the end of the range of visible light, and 1.1μm), in other words at the end of the near infra-red range. The controller 19 adjusts the air/fuel ratio in the combustion chamber on the basis of the detected maximum temperature and a programmed cycle, and to prevent overheating of the ring.

The radiation pyrometer 17 is furthermore provided with a vertically pivoting lens system 22 which generates a measurement spot of about 13 mm diameter which traverses up and down substantially over the height of the peripheral wall 8 of the centrifugal ring 5. In this way, the overall height of the peripheral wall 8 of the centrifugal ring 5 is scanned several times per second. The lens system is disposed at a distance of somewhat more than 1 meter from the peripheral wall 8 of the centrifugal ring 5.

The transducer 18 connected to the radiation pyrometer 17 is, as already mentioned, equipped with a maximum value type memory so that for each traversing movement of the lens system only the hottest detected temperature is fed to the controller 19 by the transducer whereas cqlder portions of the ring are ignored. In this way, temperature detection is oriented to the highest temperature of those parts of the surface of the ring 5 which are measured, avoiding the undesirable detection of the average temperature of too large an area. For protecting the centrifugal ring 5 against over-heating, naturally it is only the hottest location which is important.

The possibility of continuous detection of the temperature at the peripheral wall 8 of the centrifugal ring 5 is the basis for automation of control of the process of the fibering apparatus 1.

When the fibering apparatus 1 is started up, there is initially a scavenging of the combustion chamber 12 with air and then as the flow rate of air is reduced, fuel gas is supplied in a predetermined proportion until such time as there is an ignitable gas-air mixture. Afterwards, the gas-air mixture is ignited (by means which are not shown) so that there is a rise in the pressure in the combustion chamber 12 and the combustion gas flow 10 emerges therefrom. The centrifugal ring 5 is simultaneously caused to revolve at high speed by means which are not shown. The peripheral wall 8 of the centrifugal ring 5 rapdily reaches, for example, a temperature of 670° C. during this general raising of the temperature of the ring, and the radiation pyrometer 7 responds and takes over further temperature-dependent control by controlling the air/fuel ratio in the combustion chamber 12, so that a further rise in the temperature of the peripheral wall 8 takes place in a manner appropriate to the alloy present therein, for example at a rise of 50° C. per minute. This results in a corresponding increase in the quantity of fuel gas to air up to a possible maximum final ratio of, for example, 1:12.

Until the desired ring temperature is attained, the temperature of the centrifugal ring is constantly monitored by the radiation pyrometer 17 so that it cannot become overheated. Once the centrifugal ring 5 has reached the temperature needed for fibering, the actual fibering process can commence by retracting the frit channel 15 from the stream 2 of molten material. The whole sequence of operations is reversed in order to shut down the fibering apparatus 1.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured Letters Patents of the United States is:

1. A method of producing fibers from molten glass materials, comprising the steps of:
   radially outwardly discharging molten glass material via outlet orifices in a peripheral wall of a drum-like centrifugal ring;
   forming a high velocity flow of high temperature gas by combustion of fuel gas and air and impinging said flow of gas on said peripheral wall and said discharged molten material to draw said molten material into a bell like veil;
   using radiation sensing means for measuring a maximum temperature of said peripheral wall, wherein said measuring step comprises sucessively measuring limited vertically spaced portions of said peripheral wall by continuously moving a vertically pivotable spot lens over the height of said peripheral wall and measuring the maximum temperature detected in each pivot cycle; and
   using said measured maximum temperature to control said gas flow as a function of said maximum temperature, whereby said peripheral wall is not overheated.

2. An apparatus for producing fibers from molten glass materials, comprising:
   a rotatable drum-like centrifugal ring having a peripheral wall including outlet orifices;
   means for supplying molten molten glass material to said centrifugal ring, whereby said molten material is radially outwardly discharged;
   means for forming a high velocity flow of high temperature gas and impinging said flow of gas on said peripheral wall and said discharged molten material to draw said molten material into a bell-like veil;
   means for measuring a maximum temperature of said peripheral wall, comprising at least one stationary radiation pyrometer having a maximum radiation sensitivity in the range of 0.6 and 1.1$\mu$m, wherein said pyrometer includes means for continuously vertically scanning limited vertical portions of said peripheral wall; and
   means for controlling said gas flow based on said measured maximum temperature, whereby said peripheral wall is not overheated.

3. The apparatus of claim 2, wherein said means for scanning comprise a pivoting lens system, further including a maximum value type memory means for controlling said gas flow.

* * * * *